United States Patent [19]
Rockenbauch

[11] Patent Number: 6,144,189
[45] Date of Patent: Nov. 7, 2000

[54] DEVICE FOR AND METHOD OF SWITCHING AND MONITORING BATTERIES

[75] Inventor: Craig A. Rockenbauch, Severna Park, Md.

[73] Assignee: The United States of America as represented by the National Security Agency, Washington, D.C.

[21] Appl. No.: 09/493,041

[22] Filed: Jan. 27, 2000

[51] Int. Cl.[7] .................................................. H02J 7/00
[52] U.S. Cl. ........................................ 320/166; 320/118
[58] Field of Search ................................ 320/166, 116, 320/117, 118; 307/71

[56] References Cited

U.S. PATENT DOCUMENTS

| | | | |
|---|---|---|---|
| 3,666,961 | 5/1972 | Bogue et al. ........................... | 320/120 |
| 3,666,962 | 5/1972 | Bogue et al. ........................... | 320/120 |
| 4,622,508 | 11/1986 | Matteau et al. ........................ | 320/118 |
| 5,153,496 | 10/1992 | Laforge ................................. | 320/119 |
| 5,206,578 | 4/1993 | Nor ....................................... | 320/118 |
| 5,543,245 | 8/1996 | Andrieu et al. ....................... | 320/124 |
| 5,610,495 | 3/1997 | Yee et al. .............................. | 320/116 |
| 5,652,501 | 7/1997 | McClure et al. ...................... | 320/118 |
| 5,658,915 | 8/1997 | Eaves .................................... | 320/118 |
| 5,764,032 | 6/1998 | Moore ................................... | 320/126 |
| 5,894,212 | 4/1999 | Balogh .................................. | 320/116 |
| 5,898,291 | 4/1999 | Hall ....................................... | 320/118 |

*Primary Examiner*—Peter S. Wong
*Assistant Examiner*—Lawrence Luk
*Attorney, Agent, or Firm*—Robert D. Morelli

[57] ABSTRACT

The present invention is a device for switching and monitoring batteries for powering a battery-operated device that includes an n-to-1 multiplexer; batteries; a sensor array; a controller; a receiver; a transmitter; and diodes for selectively connecting power for the multiplexer, the sensor array, the controller, the receiver, and the transmitter.

17 Claims, 1 Drawing Sheet

A DEVICE FOR AND METHOD OF SWITCHING AND MONITORING BATTERIES

FIELD OF THE INVENTION

The present invention relates, in general, to electricity battery or capacitor charging or discharging and, in particular, to parallel connected batteries.

BACKGROUND OF THE INVENTION

A battery is required to power an electronic device when there is no constant source of electrical power or when it is intolerable for the source of electrical power to be interrupted. Whenever a battery-operated device is used, it is desirable to maximize its operating life. One way of doing this is to connect a number of batteries in parallel. One problem with connecting batteries directly in parallel is that current will flow from the battery with the highest voltage to the battery with the lowest voltage. Such a current may cause one or more of the batteries to burst into flame, explode, or both. A diode may be used to prevent current flow from one battery to another. Unfortunately, a diode will also cause an undesirable voltage drop. Such a voltage drop may require the use of a higher voltage battery. To increase the voltage of a battery typically requires an increase in the number of voltaic cells that make up the battery. Therefore, increasing battery voltage typically results in an increase in the size and weight of the battery, both of which may be at a premium in a battery-operated device.

Another problem with batteries is determining how many hours of operation are left on a battery. Battery voltage alone is not a good indicator of how much operating time is left on the battery. Typically, the current drain per hour on the battery is measured, the total current capacity of the battery is estimated, and the second number is divided by the first number to arrive at the number of hours of operation for the battery. Such a calculation is difficult and inaccurate if the current drain on the battery is not constant.

U.S. Pat. Nos. 3,666,961, entitled "ELECTRICAL POWER SUPPLY"; 3,666,962, entitled "ELECTRICAL POWER SUPPLY"; 5,764,032, entitled "MULTIPLE BATTERY SWITCHOVER CIRCUITS"; and 5,898,291, entitled "BATTERY CELL BYPASS TOPOLOGY," each disclose a device for switching between batteries. However, U.S. Pat. Nos. 3,666,961 and 3,666,962 use high current devices such a solenoid and a current meters which could not maximize the operating life of a battery-operated device as does the present invention. U.S. Pat. Nos. 5,764,032 and 5,898,291 do not provide the functionality as does the present invention. U.S. Pat. Nos. 3,666,961; 3,666,962; 5,764,032, and 5,898,291 are hereby incorporated by reference into the specification of the present invention.

U.S. Pat. Nos. 4,622,508, entitled "LITHIUM BATTERY PROTECTION CIRCUIT"; 5,610,495, entitled "CIRCUIT AND METHOD OF MONITORING BATTERY CELLS"; and 5,894,212, entitled "DISCHARGE MONITORING AND ISOLATING SYSTEM FOR BATTERIES," each disclose a device for testing and switching out series-connected individual voltaic cells that make up one battery and does function on multiple batteries connected in parallel as does the present invention. U.S. Pat. Nos. 4,622,508 and 5,610,495 are hereby incorporated by reference into the specification of the present invention.

SUMMARY OF THE INVENTION

It is an object of the present invention to switch between parallel-connected batteries when the battery in use dies.

It is another object of the present invention to switch between parallel-connected batteries when the battery in use dies while control circuitry is powered by the batteries which are isolated from each other by diodes.

It is another object of the present invention to switch between parallel-connected batteries by remote control based on telemetry concerning the voltage profile, current profile, and/or the temperature profile of the battery in use.

It is another object of the present invention to switch between parallel-connected batteries when the battery in use dies and to gauge the remaining operating life of a device powered by the parallel-connected batteries.

The present invention is a device for and method of switching and monitoring batteries.

The device includes an n-to-1 multiplexer. Upon command, the n-to-1 multiplexer connects one of the n multiplexer inputs to its output. In the preferred embodiment, the n-to-1 multiplexer includes a mode where none of the inputs are connected to the output of the n-to-1 multiplexer. In the present invention, when none of the inputs of the n-to-1 multiplexer is connected to the output of the n-to-1 multiplexer than no power is provided to a battery-operated device to be powered by the present invention. In the preferred embodiment, n batteries may be used.

In an alternate embodiment, the n-to-1 multiplexer always connects one of its inputs to its output. In this embodiment, one of multiplexer inputs is either connected to a ground potential or left open when no power is to be provided to the desired battery-operated device. In this embodiment, only n−1 batteries may be used.

The description that follows is in terms of the preferred embodiment.

A battery is connected to each input of the n-to-1 multiplexer.

A sensor is connected to the output of the n-to-1 multiplexer to sense at least voltage. The sensor may also sense current and temperature.

The conditions sensed by the sensor are presented to a controller. The controller, either automatically or from a remote command, controls whether or not a battery voltage is provided to the battery-operated device and which battery will provide the voltage. As the batteries die, as sensed by the sensor, the controller switches from one battery to another. The controller receives remote commands and requests from a receiver.

The controller records the sensed conditions and transmits them upon request to a remote user. From this data, the user may better estimate the life expectancy of the battery in use and the stand-by batteries.

Diodes are connected to the batteries to provide the power to the n-to-1 multiplexer, the sensor, the controller, the receiver, and the transmitter. The power is not interrupted by the switching of the n-to-1 multiplexer and is available until the last battery dies.

DETAILED DESCRIPTION

Figure 1:
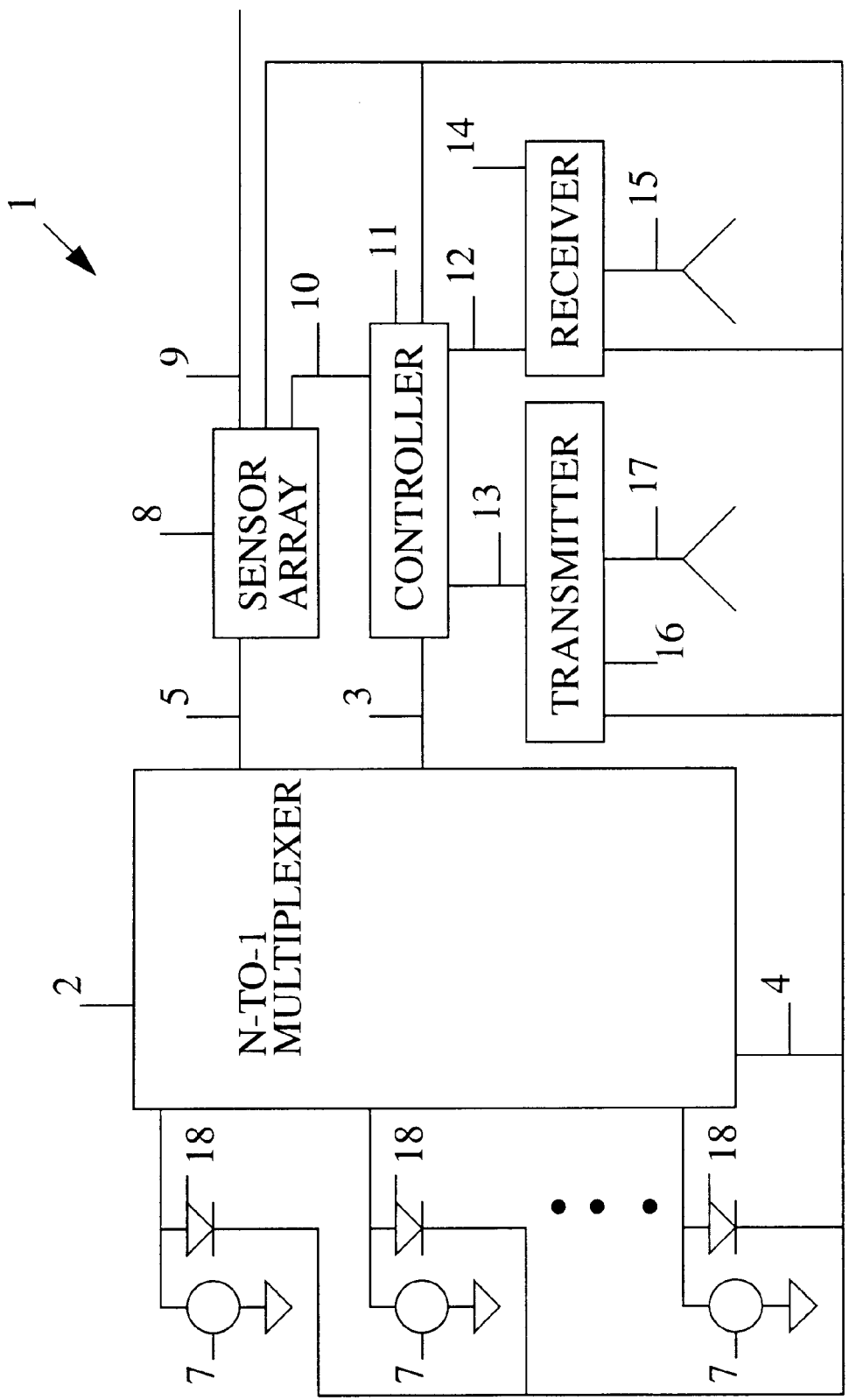
FIG. 1 is a schematic of the device of the present invention.

The present invention is a device for and method of switching and monitoring batteries.

FIG. 1 is a schematic of the device 1 of the present invention. The device 1 includes an n-to-1 multiplexer 2, having n multiplexer inputs, a command input 3, a power input 4, and an output 5. Upon command at a command input 3, the n-to-1 multiplexer 2 connects one of the n multiplexer inputs to the output 5.

In the preferred embodiment, the n-to-1 multiplexer 2 may be operated to connect either one or none of its n inputs to its output 5. In an alternate embodiment, the n-to-1 multiplexer 2 may only be commanded to connect one of its n inputs to its output 5, does not provide a state where none of its n inputs are connected to its output 5. As will be described further below, batteries 7 are to be connected to the n-to-1 multiplexer 2. In the preferred embodiment, providing no power to the output 5 of the n-to-1 multiplexer 2 is accomplished by not connecting any of the n inputs of the n-to-1 multiplexer 2 to its output 5. In an alternate embodiment, providing no power to the output 5 of the n-to-1 multiplexer 2 is accomplished by connecting one of the n inputs of the n-to-1 multiplexer 2 to its output 5, where that input is either left open (i.e., is connected to nothing) or connected to a ground potential. If the n-to-1 multiplexer 2 provides no voltage to its output 5 then any battery-operated device connected to the device 1 is off, or in sleep mode. Having a sleep mode allows for the conservation of battery power and the extension of battery life when it is not necessary to power the desired battery-operated device. In the preferred embodiment, n batteries 7 may be used (i.e., one per input to the n-to-1 multiplexer 2). In the alternate embodiment, n–1 batteries 7 may be used (i.e., one input used to provide no voltage to the output 5). The description that follows is in terms of the preferred embodiment.

A battery 7 is connected to each of the n inputs of the n-to-1 multiplexer 2. If the n-to-1 multiplexer 2 is commanded to connect one of the batteries 7 to the output 5 then power is provided to the output 5 and, eventually, to any battery-operated device connected to the device 1. Unfortunately, batteries do not last forever. Therefore, a sensor array 8 is connected to the output 5 of the n-to-1 multiplexer 2 to monitor at least the voltage of the battery 7 in use so that it may be determined when to switch to another battery 7.

The sensor array 8 has a detector input connected to the output 5 of the n-to-1 multiplexer 2, a power input connected to the power input 4 of the n-to-1 multiplexer 2, a voltage output 9 for passing the voltage on the output 5 of the n-to-1 multiplexer 2 to any battery-operated device connected thereto, and a sensor output 10. In the preferred embodiment, the sensor array 8 provides at its sensor output 10 a digital representation of the analog voltage present on the output 5 of the n-to-1 multiplexer 2 so that a profile of voltages produced by the battery 7 in use may be recorded. In the preferred embodiment, the sensor output 10 must be a bus of sufficient width to represent a voltage with the accuracy desired by the user (e.g., 2 bits, 4 bits, 8 bits, 16 bits, etc.).

In an alternate embodiment, the sensor array 8 provides at its output 10 a digital representation of whether or not the analog voltage present on the output 5 of the n-to-1 multiplexer 2 is above or below a user-definable threshold voltage. The threshold voltage must be set to a voltage above-which the user considers the battery 7 in use alive and below-which the user considers the battery 7 in use dead. The sensor output 10 of the sensor array 8 is a logic level that indicates the state of the battery 7 in use (e.g., logic 1 for a live battery 7 and logic 0 for a dead battery 7, or vice versa). Note that the sensor array 8 will indicate that the n-to-1 multiplexer 2 should switch batteries 7 when the n-to-1 multiplexer 2 is commanded to provide no voltage to its output 5. This situation is handled, along with other situations, in a controller 11.

The sensor array 8 may include additional sensors. One of these additional sensors may be a current sensor for sensing the current drawn from the battery 7 in use. If a current sensor is included in the sensor array 8 then a digital representation of the current drawn from the battery 7 in use will appear at the sensor output 10 of the sensor 8 along with the digital representation of the voltage appearing at the output 5 of the n-to-1 multiplexer 2. Another sensor that may be included in the sensor array 8 is a temperature sensor for sensing the temperature to which the battery 7 in use and the batteries 7 on standby are being subjected. If a temperature sensor is included in the sensor array 8 then a digital representation of the present temperature of the batteries 7 will appear at the sensor output 10 of the sensor array 8 along with the digital representation of the voltage appearing at the output 5 of the n-to-1 multiplexer 2.

The controller 11 has a sensor input connected to the sensor output 10 of the sensor array 8 for receiving a signal representing the voltage of the battery 7 (either a digital representation of the analog voltage or a logic level indicating whether the battery 7 in use is either dead or alive) and any other sensory information (i.e., current and/or temperature) that may be sensed by the sensor array 8. In the preferred embodiment, the controller 11 records the profiles of each characteristic sensed by the sensor array 8 (i.e., voltage and any combination of current and temperature). The controller 11 retains this information so that it may be used to better estimate the life of the battery 7 in use and the batteries 7 on standby.

The controller 11 also has a receiver input 12 for receiving a remote signal from a user. The user may command the controller 11 to put any battery-operated device connected to the voltage output 9 of the sensor array 8 to sleep (i.e., command the n-to-1 multiplexer 2 to provide no voltage to its output 5) or to wake it up (i.e., command the n-to-1 multiplexer 2 to connect one of the batteries 7 to its output 5).

The controller 11 also has a power input which is connected to the power input 4 of the n-to-1 multiplexer 2.

The controller 11 also includes a command output connected to the command input 3 of the n-to-1 multiplexer 2 for commanding the n-to-1 multiplexer 2 to connect one of its n inputs to its output 5.

Finally, the controller 11 has a status output 13 at which appears status of the device 1 as requested by the user. Status includes the state of the device 1 (i.e., sleep mode, operating mode), which batteries 7 have died, the number of hours of operation provided by each dead battery 7 and the present battery 7 in use, and the sensor profiles (i.e., voltage and any combination of current and temperature) sensed by the sensor array 8 and recorded in the controller 11.

The controller 11 may be realized with a commercially available programmable microprocessor or a specially designed circuit (discrete or integrated).

A receiver 14 for receiving and conveying commands from a remote user is connected to the controller 11. The receiver 14 has a power input connected to the power input 4 of the n-to-1 multiplexer 2. The receiver 14 also has a receiving input 15 for receiving a signal from a remote user. The remote user may send signals to the device 1 for changing from sleep mode to operating mode, changing from operating mode to sleep mode, requesting status (i.e., one or more characteristics for which status is recorded), and forcing the switching of a battery 7 in spite of the voltage reading provided by the sensor output 10 of the sensor array 8. The receiver 14 has an output for conveying the received signal to the receiver input 12 of the controller 11.

A transmitter 16 for transmitting the status of the device 1 to a remote user is connected to the controller 11. The transmitter 16 has a power input connected to the power input 4 of the n-to-1 multiplexer 2. The transmitter 16 also has a transmitting output 17 for transmitting status of the device 1 to a remote user. The status transmitted may be one or more of the characteristics for which status is recorded.

Diodes 18 are connected to the batteries 7, where the anode of one diode 18 is connected to one battery 7, and where all of the cathodes of the diodes 18 are connected together. Therefore, the highest voltage of all of the batteries 7, minus the voltage drop of the diode connected to the battery with the highest voltage, appears at the cathode of the diodes 18 and is connected to the power input of the n-to-1 multiplexer 2. The voltage appearing at the cathodes of the diodes 18 is the power supply for the n-to-1 multiplexer 2, the sensor 8, the controller 11, the receiver 14, and the transmitter 16. The voltage at the cathode of the diodes 18 is not interrupted by the switching of the n-to-1 multiplexer 2 and will be sufficient to operate the components connected thereto until all of the batteries 7 are dead.

What is claimed is:

1. A device for switching and monitoring batteries for providing power to a battery-operated device, comprising:
    a) an n-to-1 multiplexer, having n multiplexer inputs, having a command input, having a power input, and having an output, where the n-to-1 multiplexer includes a state where none of the n multiplexer inputs are connected to the output;
    b) n batteries, wherein each of the n batteries is connected to one of the n multiplexer inputs of the n-to-1 multiplexer;
    c) a sensor array, having an input connected to the output of the n-to-1 multiplexer, having a power input connected to the power input of the n-to-1 multiplexer, having a voltage output, and having a sensor output;
    d) a controller, having a sensor input connected to the sensor output of the sensor array, having a receiver input, having a power input connected to the power input of the n-to-1 multiplexer, having a command output connected to the command input of the n-to-1 multiplexer, and having a status output;
    e) a receiver, having a power input connected to the power input of the n-to-1 multiplexer, having a receiving input, and having an output connected to the receiver input of the controller;
    f) a transmitter, having a power input connected to the power input of the n-to-1 multiplexer, and having a transmitting output connected to the status output of the controller; and
    g) n diodes, where each of the n diode has a cathode and an anode, where all of the cathodes of the n diodes are connected together, where each anode of the n diodes is connected to one of the n batteries, and where the cathodes of the n diodes are connected to the power input of the n-to-1 multiplexer.

2. The device of claim 1, wherein the sensor array is a sensor selected from the group consisting of voltage sensor, current sensor, temperature sensor, and a sensor of any combination thereof.

3. The device of claim 1, wherein the sensor output of the sensor array provides a digital representation of an analog circuit condition sensed.

4. The device of claim 1, wherein the sensor output is a bus of sufficient width to transmit an output of a user-definable accuracy.

5. The device of claim 1, wherein the controller is selected from controllers selected from the group consisting of programmable microprocessor, discrete controller, and integrated circuit controller.

6. The device of claim 2, wherein the sensor output of the sensor array provides a digital representation of an analog circuit condition sensed.

7. The device of claim 6, wherein the sensor output is a bus of sufficient width to transmit an output of a user-definable accuracy.

8. The device of claim 7, wherein the controller is selected from controllers selected from the group consisting of programmable microprocessor.', discrete controller, and integrated circuit controller.

9. A device for switching and monitoring batteries for providing power to a battery-operated device, comprising:
    a) an n-to-1 multiplexer, having n multiplexer inputs, having a command input, having a power input, and having an output, where the n-to-1 multiplexer does not include a state where none of the n multiplexer inputs are connected to the output;
    b) n−1 batteries, wherein each of the n−1 batteries is connected to one of the n multiplexer inputs of the n-to-1 multiplexer;
    c) a sensor array, having an input connected to the output of the n-to-1 multiplexer, having a power input connected to the power input of the n-to-1 multiplexer, having a voltage output, and having a sensor output;
    d) a controller, having a sensor input connected to the sensor output of the sensor array, having a receiver input, having a power input connected to the power input of the n-to-1 multiplexer, having a command output connected to the command input of the n-to-1 multiplexer, and having a status output;
    e) a receiver, having a power input connected to the power input of the n-to-1 multiplexer, having a receiving input, and having an output connected to the receiver input of the controller;
    f) a transmitter, having a power input connected to the power input of the n-to-1 multiplexer, and having a transmitting output connected to the status output of the controller; and
    g) n−1 diodes, where each of the n−1 diode has a cathode and an anode, where all of the cathodes of the n−1 diodes are connected together, where each anode of the n−1 diodes is connected to one of the n−1 batteries, and where the cathodes of the n−1 diodes are connected to the power input of the n-to-1 multiplexer.

10. The device of claim 9, further including a ground potential connected to one of the n multiplexer inputs of the n-to-1 multiplexer.

11. The device of claim 9, wherein the sensor array is a sensor selected from the group consisting of voltage sensor, current sensor, temperature sensor, and a sensor of any combination thereof.

12. The device of claim 9, wherein the sensor output of the sensor array provides a digital representation of an analog circuit condition sensed.

13. The device of claim 9, wherein the sensor output is a bus of sufficient width to transmit an output of a user-definable accuracy.

14. The device of claim 9, wherein the controller is selected from controllers selected from the group consisting of programmable microprocessor, discrete controller, and integrated circuit controller.

15. The device of claim 11, wherein the sensor output of the sensor array provides a digital representation of an analog circuit condition sensed.

16. The device of claim 15, wherein the sensor output is a bus of sufficient width to transmit an output of a user-definable accuracy.

17. The device of claim 16, wherein the controller is selected from controllers selected from the group consisting of programmable microprocessor.', discrete controller, and integrated circuit controller.

\* \* \* \* \*